Sept. 15, 1964   F. ALVAREZ DE TOLEDO   3,148,411
MOLDING PLASTIC PANELS
Filed April 21, 1961   3 Sheets-Sheet 1

INVENTOR.
FERNANDO ALVAREZ DE TOLEDO
BY
*Stachin & Overman*
ATTORNEYS

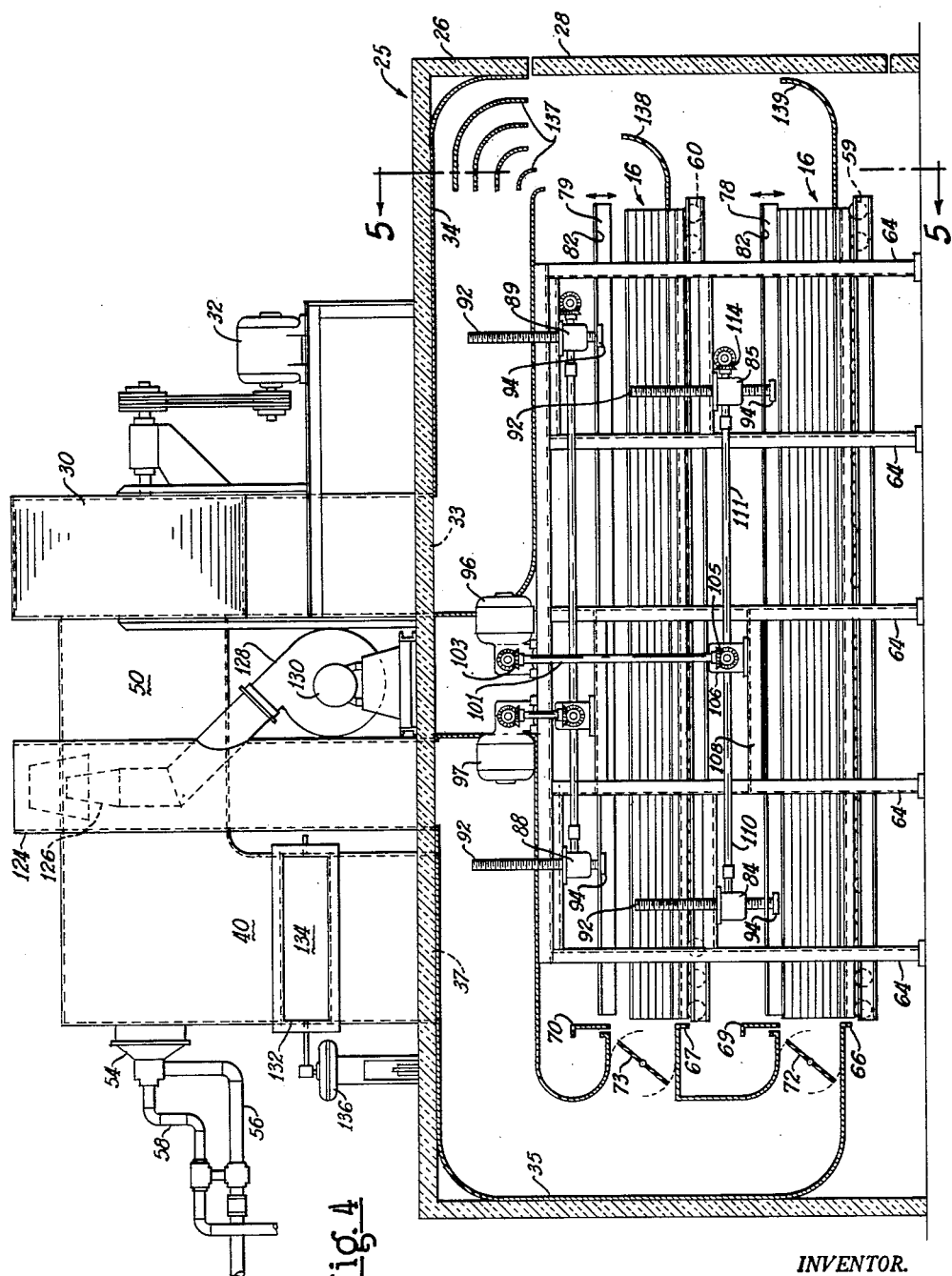

INVENTOR.
FERNANDO ALVAREZ DE TOLEDO
BY
ATTORNEYS

United States Patent Office 3,148,411
Patented Sept. 15, 1964

3,148,411
MOLDING PLASTIC PANELS
Fernando Alvarez de Toledo, New York, N.Y., assignor to Owens-Corning Fiberglas Corporation, a corporation of Delaware
Filed Apr. 21, 1961, Ser. No. 104,755
13 Claims. (Cl. 18—4)

This invention relates to plastic panels for structural purposes and particularly to apparatus and methods for molding such products. The panels may be flat, corrugated or steplap in shape, and for strength and permanence are generally reinforced with fibrous glass. Being translucent and colorful, they are employed variously as awnings, patio roofing partitions and shelves.

Polyesters are the common plastic constituent. Acrylic resins and polyester-methyl methacrylate combinations as well as silicones and epoxy plastics are also suitable and may have certain advantages in some circumstances, although of greater cost.

In the production of the panels the plastic batch material, including the basic resin, monomer, catalyst and, when required, accelerators and pigments is calendered or extruded in sheet form. A fibrous glass reinforcing mat sandwiched between fibrous glass surfacing mats may be incorporated in the sheet of plastic by being fed with the plastic through the forming apparatus.

For protection of the panel blanks and to prevent their sticking to mold plates, cellophane films are applied to the sides of the projected sheet of fibrous glass reinforced plastic.

Each panel blank is then placed between cauls or mold plates and stacks of these assemblies are placed under pressure in ovens for curing. For satisfactory products pressures and temperatures during the curing cycle should be carefully controlled as undercuring results in panels with poor weathering capability and overheating causes boiling which spoils the appearance of the product. While prolonging the curing operation may minimize possible difficulties, for reasons of economy the procedure must be expedited.

A prime purpose of this invention is to facilitate the curing process of plastic panels.

More specifically an object of this invention is to provide an apparatus for rapidly applying a distributed and selective pressure upon panel blanks of large area during the curing cycle.

A further object is to provide means for accelerating the application of curing heat to the panel blanks.

These and other objects of the invention are attained through the provision of special apparatus for mechanically lowering a weight load, controlled in magnitude and distribution, upon the panel blanks within a curing oven and of additional apparatus for driving heated air into close association with the panel blanks while in the oven.

Such apparatus and the advantages thereof will be explained further in connection with the drawings in which:

FIGURE 4 is a vertical longitudinal section of one embodiment of a curing apparatus of this invention.

Figure 1:
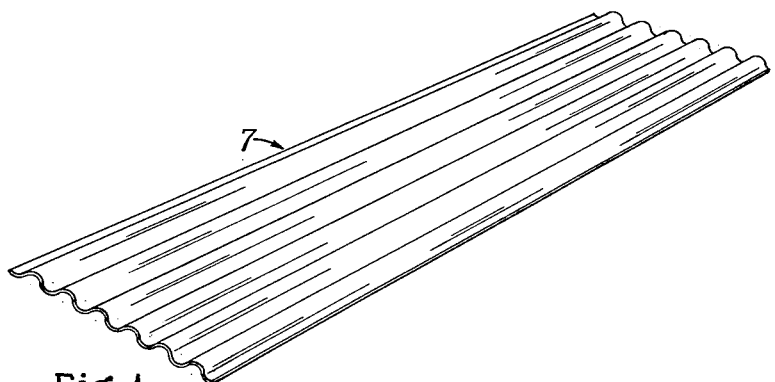
FIGURE 1 is a perspective view of a finished corrugated panel of the type with which this invention is concerned.

Referring to the drawings in more detail, the finished corrugated panel 7 of FIGURE 1 may be from two to four feet in width and eight to twelve feet long with a thickness between .037 and .112 of an inch. It is desirably composed of a polyester plastic in which is embedded a fiber glass reinforcing mat of a weight around 1.75 ounces per square foot, and surfacing mats of bonded fiber glass of ten mil thickness. The mats are conventionally coated with a finish such as a silane or chrome compatible with the particular plastic resin utilized. In the usual practice of this invention, the reinforcing mat of fibrous glass sandwiched between the thin surfacing mats is led through a bath of the polyester plastic. The saturated web thus formed is then directed between nip rolls to be extruded in sheet form. Cellophane sheets are directed around the rolls and imposed against the upper and lower sides of the extruded web.

The resulting web laminated blank 8 is projected upon a flat table on which a smoothing operation is carried on through the use of squeegees and similar tools. Excess liquid plastic is forced away from the border of the lamination and the cellophane sheets are sealed together at their edges by pressure to prevent the entry of air bubbles.

Figure 3:
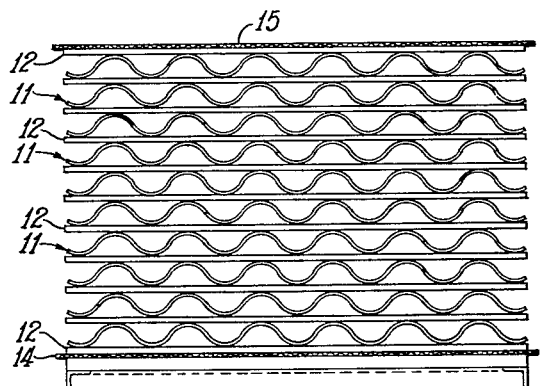
FIGURE 3 is an end elevation of a completed stack of panel blanks as prepared for introduction into the curing apparatus of this invention.
Figure 2:
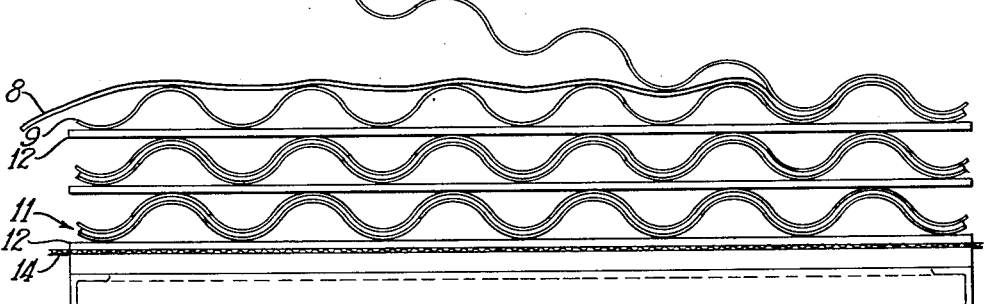
FIGURE 2 is an elevational view illustrating the manner of forming a stack of panel blank positioned between corrugated molding plates.

As indicated in FIGURE 2 the composite panel blanks 8 are laid between pairs of matching mold plates 9 and 10 and carefully forced to conform with the corrugated contour thereof. Upon each resulting unit 11 of the plate enclosed blanks is positioned a flat plate 12. This superpositioning upon platform 13 is continued until stack 16 of a height adaptable for processing is completed, as shown in FIGURE 3. Such a stack may include from one to twenty of the units 11 depending upon the overall thickness of the panel blanks. It is preferred that the stack 16 have protective sheets of corrugated paper 14 and 15 on its upper and lower surfaces. The stack is then brought by suitable conveyor means to the curing apparatus.

Figure 5:
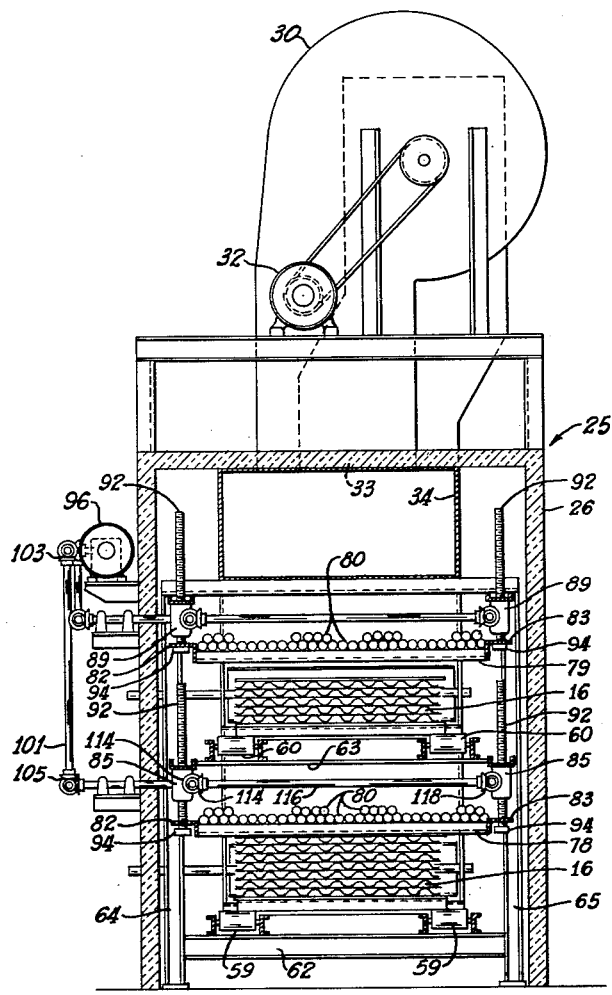
FIGURE 5 is a vertical cross section of the apparatus of FIGURE 4 taken on the line 5—5 thereof.

As shown in FIGURES 4 and 5 this apparatus includes an oven 25 defined by the casing 26 which has an entrance door 28. Heated air is forced by a blower 30, driven by the motor 32, into the oven 25 through inlet opening 33 in the top of the oven. This air flow is directed downwardly by baffles 137 at the front of the oven from duct 34, and into the stacks by the removable scoops 138 and 139.

At the rear of the oven the air enters ductwork 35 and travels upwardly through the roof opening 37 into the vertical conduit 40, from which the air moves along the horizontal duct section 50 for recirculation through the blower 30. A burner 54 for heating the air projects into duct section 50. Combustion air and gas fuel reach burner 54 through supply pipes 56 and 58.

A lower conveyor for receiving a stack 16 of panel blanks is formed of a pair of roller trains 59. A second stack may be received upon a similar roller conveyor 60 situated above conveyor 59. These conveyors are mounted on sets of cross beams 62 and 63 which extend between lined posts 64 and 65.

The lower conveyor 59 preferably receives the first stack conveniently brought to the oven upon a hoist equipped truck, preferably self propelled.

The stack is pushed back on the rollers of conveyor 59 until the entering end of the stack abuts the peripheral flange 66 around the lower opening into the ductwork 35. This flange may carry a gasket to improve the sealing contact. A similar flange 67 is placed to contact the end of a second stack directed into the oven upon the upper conveyor 60. Air flow through the passages outlined by the flanges is controlled by the pivotable dampers 72 and 73.

After the stack is thus positioned a predetermined weight is brought down upon the top of the stack to hold the plastic panel blanks 8 tightly between the molding plates 9 and 10. The lower weight mechanism includes plate 78 and a selected number of weight bars 80. There is a like plate 79 carrying weight bars above the upper conveyor 60. The plate 78 has side flanges 82 and 83 by which it is supported by a pair of rear jacks 84, and a pair of forward jacks 85. Similar pairs of jacks 88 and 89 support the upper weight plate 79.

Each jack has a worm driven threaded rod 92 projecting vertically therethrough. These rods pass downwardly through oversize holes in the side flanges 82 and 83 and each has an enlarged cap 94 underlying the side flange and supporting the weight plate therethrough.

To lower the weight plate 78 upon the stack, motor 96 is actuated. This motor rotates the vertical shaft 101 through the pair of beveled gears 103; and shaft 101 through a second pair of beveled gears 105 and gear box 106 drives horizontal shafts 110 and 111. Gear box 106 is mounted on cross beam 108 extending between two of the posts 64.

Shaft 110 is connected to one of the pair of jacks 84 and therethrough moves the vertical rod 92 extending through this jack downwardly. In the model of jack utilized the rod has a maximum longitudinal movement of eighteen inches. The vertical rod 92 of the jack 82 with which shaft 111 is connected is moved downwardly simultaneously.

A pair of beveled gears 114 are motivated by shaft 111 through jack 82 to turn the transverse shaft 116. This shaft acts through a pair of beveled gears 118 to lower the rods of the jacks 84 and 85 on the other side of the oven contempararily with the movement of rods of the opposite jacks.

The weight plate 78 with its load of weight bars 80 is thus brought down upon the stack 16 on the lower roller conveyor 59. The operation of the motor 96 is continued to bring the caps 94 on the lower ends of rods 92 out of engagement with the side flanges 82 and 83 of the weight plate 78. The latter is thus released and permitted to comply with any inclination from a horizontal plane in the top of the stack that might develop from compression of the stack.

The weight frame 78, for example, may weigh 1750 pounds and each weight bar forty-five pounds. The desired load on the stack is largely determined by experience and is likely to lie within a range of seventy-five to one hundred and fifty pounds per square foot for the relatively low pressure laminates here involved. The bars 80 may be located to provide an uneven distribution of weight should this be advantageous. After a satisfactory weight load is determined for a specific type of panel, no further change is usually necessary. The desired pressure is thus easily and quickly applied to the broad area of each successive stack brought to the oven.

A second stack placed on the upper oven conveyor 60 is loaded in the same manner by lowering of the weight plate 79 through operation of motor 97.

The door 28 of the oven is then closed and blower 30 is operated to start a high speed flow of heated air lengthwise through the stack units. The primary curing temperature is generally between 140° and 175° F. and the final cure after the exotherm peak is reached is accomplished under a temperature of around 215° F. The total curing time depends upon the particular resin composition and may extend from thirty minutes to one or two hours.

The flow of heated air driven down through duct 34 by the blower 30 is confined to a path longitudinally through the stacks as the openings to air outlet ductwork 35 are spanned by the inner ends of the stacks. Variation in the height of the stacks presents no problem as the vertically slidable vanes 69 and 70 are adjusted to seal against the top of the stacks. In case a stack is not positioned upon the upper conveyor 60 the air exit therefrom into ductwork 35 is closed by the damper 73.

With the flat plates 12 between the units 11 of the panel blanks 8 and the mold plates 9 and 10, the units 11 are held apart and the heated air travels along the valleys of the corrugated contours in close heat transfer relation with the mold plates.

After the curing cycle is completed it is necessary to reduce the temperature within the oven for the comfort of the personnel responsible for removing the stacks from the oven. The burner 54 is accordingly turned down and the heated air is exhausted through stack 124. This air movement is motivated by the induction effect of air discharged from the nozzle 126 within the stack 124. This propelling air is supplied by blower 128 driven by motor 130. To replace the heated air thus drawn from the oven, atmospheric air is admitted through opening 132 in the side of the vertical passage 40. This opening is controlled by pivotable vane 134 which is actuated by the fluid powered mechanism 136. The cooling atmospheric air is circulated through the oven by the continued operation of the main blower 30.

With the temperature of the stacks reduced to a handleable state and the weight plates raised by reversal of motors 96 and 97 the oven door 28 is opened and the stacks removed.

The stacks are assembled and the mold plates separated from the finished panels. The latter are then trimmed and the cellophane stripped therefrom. Before their next lay-up use the mold plates must be cleaned and brought down to approximately room temperature.

A polyester resin has been utilized herein for purposes of explanation, but as previously indicated various other plastics are suitable for the structural panels with which the invention is concerned. Also, while it is much preferred to have the panels reinforced with fibrous glass, the invention is of course adaptable to plain plastic panels.

For flat panels or those with shallow corrugations or steplap configurations, it is recommended that corrugated plates between flat plates be positioned in a stack between each set or between pairs of sets of mold plates enclosing a panel blank. The valleys of the corrugated spacers will thus provide an ample path for the curing air.

While overhead jacks are disclosed herein for suspending the weight plates, the jacks may be positioned to support the weight plates from below. Also, hydraulic cylinders or electric hoist devices may, of course, be substituted for the mechanical jacks.

The long cylindrical bars 80 are ideally dimensioned for loading the weight plates. Units of other shapes may be substituted therefor without loss of function.

In summary, the main features of the invention reside in the means provided for quickly applying a distributed weight of predetermined magnitude over the broad area of the stacks and in the arrangement for directing curing air at a high flowing rate in intimate association with the mold enclosed panel blanks.

I claim:

1. Apparatus for applying pressure upon the top of a stack of plastic panel blanks during the curing thereof, including an oven, a receiving station in the oven for the stack, a plurality of mechanically driven jacks, a planar weight plate of an area extending over the full top of the stack, said weight plate being floatingly suspended from the jacks, and means for simultaneously actuating the jacks to lower the weight plate against the top of the stack, the weight plate being independent from the jacks upon reaching the top of the stack.

2. An apparatus according to claim 1 in which the means for simultaneously actuating the jacks includes a motor located exteriorly of the oven, a single rotatable shaft driven by the motor and projecting into the oven, and rotatable shafts and gearing linking the jacks to the single rotatable shaft.

3. Apparatus according to claim 1 in which the means by which the planar weight plate is floatingly suspended from the jacks includes rods depending from the jacks and extending through oversize apertures in the plate and enlargements on the ends of the rods upon which the plate is supported.

4. Apparatus according to claim 1 in which there are cylindrical bars removably carried by the weight plate for selective variation of the weight thereof.

5. Apparatus for applying pressure upon the top of a stack of plastic panel blanks during the curing thereof, including an oven, a receiving station in the oven for the stack, a plurality of lowering devices, a weight plate of an area extending over the full top of the stack, means by which said weight plate is floatingly suspended from the lowering devices, and means for simultaneously actuating the lowering devices to lower the weight plate against the top of the stack, the weight plate being positionally independent from the lowering devices upon settling upon the top of the stack.

6. Apparatus according to claim 5 in which the means by which the weight plate is floatingly suspended from the lowering devices includes elongated members depending from the lowering devices and extending through oversize apertures in the plate and there are enlargements on the ends of the elongated members upon which the plate is supported.

7. Apparatus according to claim 5 in which there are a plurality of weight units removably carried by the weight plate for selective variation of the weight thereof.

8. Apparatus for molding and curing plastic panel blanks including an oven, a station in the oven for receiving a stack of plastic panel blanks, generally rigid molding and spacing plates holding the plastic panel blanks in desired shape and in vertically spaced relation in the stack, and providing a plurality of closely arrayed, straight-through, parallel air channels horizontally through the stack, means directing heated curing air through the oven, and partition means limiting the heated curing air to a confined path into the air channels through the stack, said plates including corrugated and flat plates, pairs of two like plates serving as molding plates continuously and tightly enclosing each panel blank, and adjacent corrugated and flat plates forming the air channels and vertically spacing the panel blanks.

9. Apparatus according to claim 8 in which the corrugated plates are of smoothly undulating cross section.

10. Apparatus for molding and heat curing plastic panel blanks including an oven, a station in the oven for receiving a stack of plastic panel blanks, a pair of matched, rigid, heat conducting mold plates in continuous contact with each panel blank and between which the blank is held in desired form, a spacing plate positioned between adjacent pairs of mold plates and defining with the adjacent mold plate of each pair a plurality of unidirectional, parallel, open-ended air passages running horizontally through the stack, said passages being separated by narrow linear contacting portions of the spacing plate and the adjacent mold plates, means applying downwardly directed compressing pressure to the stack and thus holding the mold plates tightly against the panel blanks, means directing heated curing air through the oven, and partition means confining the heated air to a path leading through the open-ended passages running horizontally through the stack, whereby substantially the full outer area of each heat conducting mold plate is contacted by a constant flow of heated curing air.

11. Apparatus according to claim 10 in which said mold paltes are of corrugated form and the spacing plates are flat.

12. Apparatus according to claim 10 in which said mold plates are flat and the spacing plates are of corrugated form.

13. Apparatus for applying pressure upon the top of a stack of plastic panel blanks during the curing thereof including an oven, a receiving station in the oven for the stack, a planar weight plate of an area extending over the full top of the stack, four worm driven jacks from which the weight plate is floatingly suspended, and means for simultaneously actuating the four jacks to lower the weight plate against the top of the stack, the weight plate being positionally independent from the jacks upon reaching the top of the stack due to its floating suspension from the jacks.

References Cited in the file of this patent

UNITED STATES PATENTS

| | | |
|---|---|---|
| 309,685 | Blunt | Dec. 23, 1884 |
| 1,420,371 | Emmons | June 20, 1922 |
| 1,539,239 | Bull | May 26, 1925 |
| 1,543,890 | Williams | June 30, 1925 |
| 2,064,965 | Will | Dec. 22, 1936 |
| 2,096,326 | Hengerer | Oct. 19, 1937 |
| 2,266,336 | Royer | Dec. 16, 1941 |
| 2,357,867 | Babbitt et al. | Sept. 12, 1944 |
| 2,366,435 | Brown | Jan. 2, 1945 |
| 2,385,628 | Larkin et al. | Sept. 25, 1945 |
| 2,686,142 | Cory | Aug. 10, 1954 |
| 2,901,811 | Hall | Sept. 1, 1959 |